United States Patent
Krauss et al.

(10) Patent No.: US 8,075,178 B2
(45) Date of Patent: Dec. 13, 2011

(54) CIRCUIT ARRANGEMENT TO ADJUST AND CALIBRATE A MEMS-SENSOR DEVICE FOR FLOW MEASUREMENT OF GASES OR LIQUIDS

(75) Inventors: Mathias Krauss, Centerport, NY (US); Maha Jaafar, Madison, WI (US)

(73) Assignee: Zentrum Mikroelektronic Desden AG, Dresden (DE)

( * ) Notice: Subject to any disclaimer, the term of this patent is extended or adjusted under 35 U.S.C. 154(b) by 458 days.

(21) Appl. No.: 12/369,645

(22) Filed: Feb. 11, 2009

(65) Prior Publication Data
US 2009/0201969 A1    Aug. 13, 2009

Related U.S. Application Data

(60) Provisional application No. 61/027,698, filed on Feb. 11, 2008.

(51) Int. Cl.
*G01K 15/00* (2006.01)
*G01F 1/696* (2006.01)
*G01F 1/698* (2006.01)

(52) U.S. Cl. .... 374/1; 374/E15.001; 73/1.34; 73/204.11
(58) Field of Classification Search ....... 374/1, E15.001, 374/E15.002; 73/1.16, 1.34, 204.11
See application file for complete search history.

(56) References Cited

U.S. PATENT DOCUMENTS

| | | | | |
|---|---|---|---|---|
| 3,992,940 A * | 11/1976 | Platzer, Jr. | | 73/204.19 |
| 6,763,710 B2 * | 7/2004 | Mayer et al. | | 73/204.11 |
| 7,010,971 B2 * | 3/2006 | Matsumoto et al. | | 73/204.15 |
| 7,102,417 B2 * | 9/2006 | Gordon et al. | | 374/1 |
| 7,401,510 B2 * | 7/2008 | Ando | | 73/204.15 |

FOREIGN PATENT DOCUMENTS

| | | | |
|---|---|---|---|
| EP | 1541974 A1 * | 6/2005 | |
| EP | 1696215 A1 * | 8/2006 | |
| EP | 2088402 A1 * | 8/2009 | |

* cited by examiner

*Primary Examiner* — R. A. Smith
(74) *Attorney, Agent, or Firm* — Heslin Rothenberg Farley & Mesiti P.C.

(57) ABSTRACT

Circuitry is disclosed for the calibration of heating element and ambient temperature sensors, comprising: a) an amplifier having positive and negative inputs, and an output; b) one or more heating MOS transistors selectably coupled in parallel and having 1) a heating transistor drain coupled to the positive input of the amplifier; 2) a heating transistor source configured to receive a supply voltage; and 3) a heating transistor gate coupled to the amplifier output; c) one or more ambient MOS transistors selectably coupled in parallel and having 1) an ambient transistor drain, 2) an ambient transistor gate coupled to the amplifier output; and 3) an ambient transistor source configured to receive the supply voltage; d) a temperature difference resistance configured: 1) to be coupled at least partially between an ambient connection and the ambient transistor drain; and 2) to be coupled at least partially between the ambient connection and the negative input of the amplifier.

20 Claims, 6 Drawing Sheets

CIRCUIT ARRANGEMENT TO ADJUST AND CALIBRATE A MEMS-SENSOR DEVICE FOR FLOW MEASUREMENT OF GASES OR LIQUIDS

RELATED APPLICATIONS

This application claims priority to U.S. provisional patent application 61/027,698 filed on Feb. 11, 2008 and entitled "CIRCUIT ARRANGEMENT TO ADJUST AND CALIBRATE A MEMS-SENSOR FOR FLOW MEASUREMENT OF GASES OR LIQUIDS." This application hereby incorporates the 61/027,698 provisional application by reference in its entirety.

FIELD

The claimed invention generally relates to sensor calibration and more specifically to circuitry and methods for adjusting and calibrating a micro-electro-mechanical system (MEMS) sensor device for flow measurement of gases or liquids.

BACKGROUND

Many sensors devices are available for the flow measurement of gases or liquids, depending on the desired application. Recently, due to rapid developments in the field of micro-electro-mechanical systems (MEMS) technology, numerous types of traditionally scaled sensor devices have been reduced in size, leading to the development of completely new market segments and applications. This trend of sensor devices miniaturization, coupled with opportunities in cost reduction, has led to demand for complete integrated sensor device solutions, which include signal conditioning, for example, by means of integrated circuits. As such, it has become highly desirable to try to develop two or even one chip solutions, which include the sensor components, sensor excitation, sensor signal processing and supply of an analog or digital output signal.

There is a particular need to have an integrated sensor solution in the field of flow sensing based on the principle of the thermal mass flow rate. Such sensor devices could include a heating element or resistor (heater) and a Wheatstone Bridge from thermistors (heating element sensor) which are arranged in such a way that a flowing medium transports heat energy from the heating element (heater) to the heating element sensor. This produces a voltage difference, which, after signal conditioning, represents a measure for the liquid or gas flow rate. However, in order to make signal conditioning possible, the difference between the temperature of the heater and the ambient temperature must be well-known or even better constant.

Therefore, in order to know the ambient temperature, a further temperature sensor (ambient temperature sensor) is necessary to determine the ambient temperature. Current solutions use two resistors with the same temperature coefficient (TC), one for the heating element, and one for the ambient temperature sensor. The resistance value of the heating element is determined on the basis of the available operating voltage and the necessary thermal output. The resistance value of the ambient temperature sensor is chosen to be a multiple of the resistance value of the heating element, in order to avoid self heating. Both resistors are part of a control loop where they are supplied with regulated currents, which are constant in ratio. Through the variation of the absolute size of these currents the control loop adjusts itself to an operating point, which guarantees a constant temperature difference between the heating element and environment, independently of variables like supply voltage, thermal resistance of the MEMS sensor, the type of flowing medium, or the ambient temperature. While the heating element, the heating element sensor, and the ambient temperature sensor are integrated into today's MEMS sensor devices, three further external (non-integrated) resistors are necessary in addition to an operation amplifier for controlling the loop. These further resistors are discretely implemented, since they must be adjustable, in order to compensate the tolerances of the MEMS sensor devices.

Unfortunately, the discrete resistors and their complex adjustment as part of the finished sensor module is holding back a cost efficient two or one chip solution. Therefore, it would be desirable to have an integratable, low-cost circuit to adjust and calibrate a MEMS sensor device for flow measurement of gases or liquids, thereby enabling an integrated MEMS sensor solution.

SUMMARY

Circuitry is disclosed for the adjustment and calibration of a heating element and an ambient temperature sensor. The circuitry includes an amplifier having a positive input, a negative input, and an output. The circuitry also includes one or more heating metal oxide semiconductor (MOS) transistors selectably coupled in parallel and having a heating transistor gate, a heating transistor source, and a heating transistor drain, wherein: 1) the heating transistor drain is coupled to the positive input of the amplifier; 2) the heating transistor source is configured to receive a supply voltage; and 3) the heating transistor gate is coupled to the amplifier output. The circuitry further includes one or more ambient MOS transistors selectably coupled in parallel and having an ambient transistor gate, an ambient transistor source, and an ambient transistor drain, wherein: 1) the ambient transistor gate is coupled to the amplifier output; and 2) the ambient transistor source is configured to receive the supply voltage. The circuitry also includes a temperature difference resistance configured: 1) to be coupled at least partially between an ambient connection and the ambient transistor drain; and 2) to be coupled at least partially between the ambient connection and the negative input of the amplifier.

A method of adjusting and calibrating a heating element and an ambient temperature sensor is also disclosed. A first number of heating MOS transistors are selectably coupled in parallel. A second number of ambient MOS transistors are selectably coupled in parallel. A bias current is removeably applied to a collective gate of the first number of heating MOS transistors, thereby creating a first current through a collective drain of the first number of heating MOS transistors. The bias current is removeably applied to a collective gate of the second number of ambient MOS transistors, thereby creating a second current through a collective drain of the second number of ambient MOS transistors. A first voltage caused by the first current passing through the heating element is determined. A second voltage caused by the second current passing through the ambient temperature sensor is determined. The first number of heating MOS transistors and/or the second number of ambient MOS transistors selectably coupled in parallel are adjusted to substantially minimize a difference between the first voltage and the second voltage.

Further circuitry for the adjustment and calibration of a heating element and an ambient temperature sensor is disclosed. The circuitry has a heating connection configured to be coupled to the heating element. The circuitry also has an ambient connection configured to be coupled to the ambient temperature sensor. The circuitry also has a potentiometer having a first terminal, a second terminal, and a wiper, wherein the first terminal is coupled to the ambient connection. The circuitry also has a reference connection configured to be coupled to the potentiometer wiper. The circuitry also has an amplifier having a positive input, a negative input, and an output, wherein: 1) the negative input is coupled to the reference connection; and 2) the positive input is coupled to the heating connection. The circuitry also includes one or more heating metal oxide semiconductor (MOS) transistors selectably coupled in parallel and having a heating transistor gate, a heating transistor source, and a heating transistor drain, wherein: 1) the heating transistor drain is coupled to the heating connection; and 2) the heating transistor source is configured to receive a supply voltage. The circuitry also includes one or more ambient MOS transistors selectably coupled in parallel and having an ambient transistor gate, an ambient transistor source, and an ambient transistor drain, wherein: 1) the ambient transistor drain is coupled to the second terminal of the potentiometer; and 2) the ambient transistor source is configured to receive the supply voltage. The circuitry also has a calibration MOS transistor having a calibration transistor gate, a calibration transistor source, and a calibration transistor drain, wherein 1) the calibration transistor source is configured to receive the supply voltage; 2) the calibration transistor drain is configured to receive a bias current; and 3) the calibration transistor gate is coupled to the calibration transistor drain. The circuitry further has a selection switch having a first input, a second input, and an output, wherein: 1) the first switch input is coupled to the amplifier output; 2) the second switch input is coupled to the calibration transistor gate; and 3) the switch output is coupled to the ambient transistor gate and the heating transistor gate.

A goal of the claimed invention is a circuit architecture which makes it possible to replace external resistors in a heater control loop of prior art solutions by providing an integration-friendly solution while ensuring all requirements of stability and accuracy. A further goal of the claimed invention is a circuit configuration and a procedure that enables an efficient adjustment of the current ratio on the individual sensor parameters. Since the precision of the measurement can be substantially improved, if the temperature dependence of the heat transport in the heating element sensor is part of the signal conditioning, it is an advantage to have access to the ambient temperature by direct measurement. A procedure for it, which can be realized with the suggested circuit without extra components, is likewise a goal of the invention.

Figure 1:
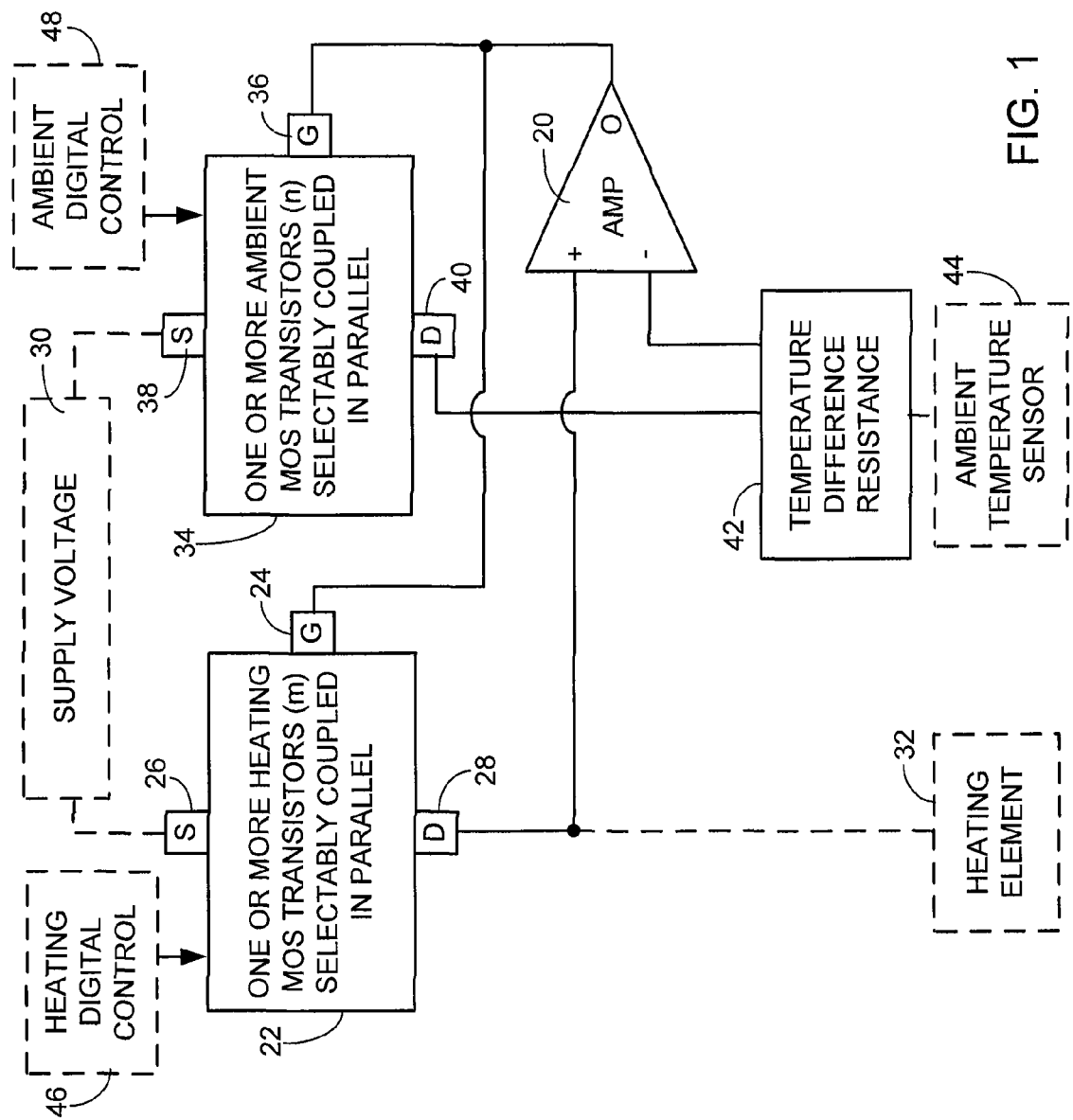
FIGS. 1-4 schematically illustrate embodiments of circuitry for adjusting and calibrating a MEMS sensor device for flow measurement of gases or liquids.

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION

FIG. 1 schematically illustrates an embodiment of circuitry for adjusting and calibrating a MEMS sensor device for flow measurement of gases or liquids. An amplifier 20 has positive and negative inputs and an output (O). One or more heating metal oxide semiconductor (MOS) transistors 22 are selectably coupled in parallel. The one or more heating MOS transistors 22 are part of a control loop which provides current to a heating element 32 (therefore identified as heating MOS transistors). Collectively, the parallel heating MOS transistors 22 have a heating transistor gate 24, a heating transistor source 26, and a heating transistor drain 28. The heating transistor drain 28 is coupled to the positive input of the amplifier 20, the heating transistor source 26 is configured to receive a supply voltage 30, and the heating transistor gate 24 is coupled to the amplifier 20 output.

Similarly, one or more ambient MOS transistors 34 are selectably coupled in parallel. (The one or more ambient MOS transistors 34 are part of a path with the ambient temperature sensor 44 and therefore identified as ambient MOS transistors). Collectively, the parallel ambient MOS transistors 34 have an ambient transistor gate 36, an ambient transistor source 38, and an ambient transistor drain 40. The ambient transistor gate 36 is coupled to the amplifier 20 output. The ambient transistor source 38 is configured to receive the supply voltage 30.

A temperature difference resistance 42 is configured to be coupled 1) at least partially between an ambient temperature sensor 44 and the ambient transistor drain 40 and 2) at least partially between the ambient temperature sensor 44 and the negative input of the amplifier 20. The temperature difference resistance 42 is used to set the rise in temperature of the heating element 32 in relation to the ambient temperature sensor 44.

The one or more heating MOS transistors 22 and the one or more ambient MOS transistors are readily integrated as part of a MEMS device. As will be detailed further in this specification, the number (m) of the one or more heating MOS transistors and/or the number (n) of the one or more ambient MOS transistors which are selectively coupled in parallel may be adjusted via digital controls 46, 48 in order to adjust the current ratio through the heating element 32 and the ambient temperature sensor 44 to match the ratio of the resistances of the heating element 32 and the ambient temperature sensor 44, thereby calibrating the heating element 32 and the ambient temperature sensor 44, for tolerance differences. This process will be described in greater detail through the following specification.

Figure 2A:
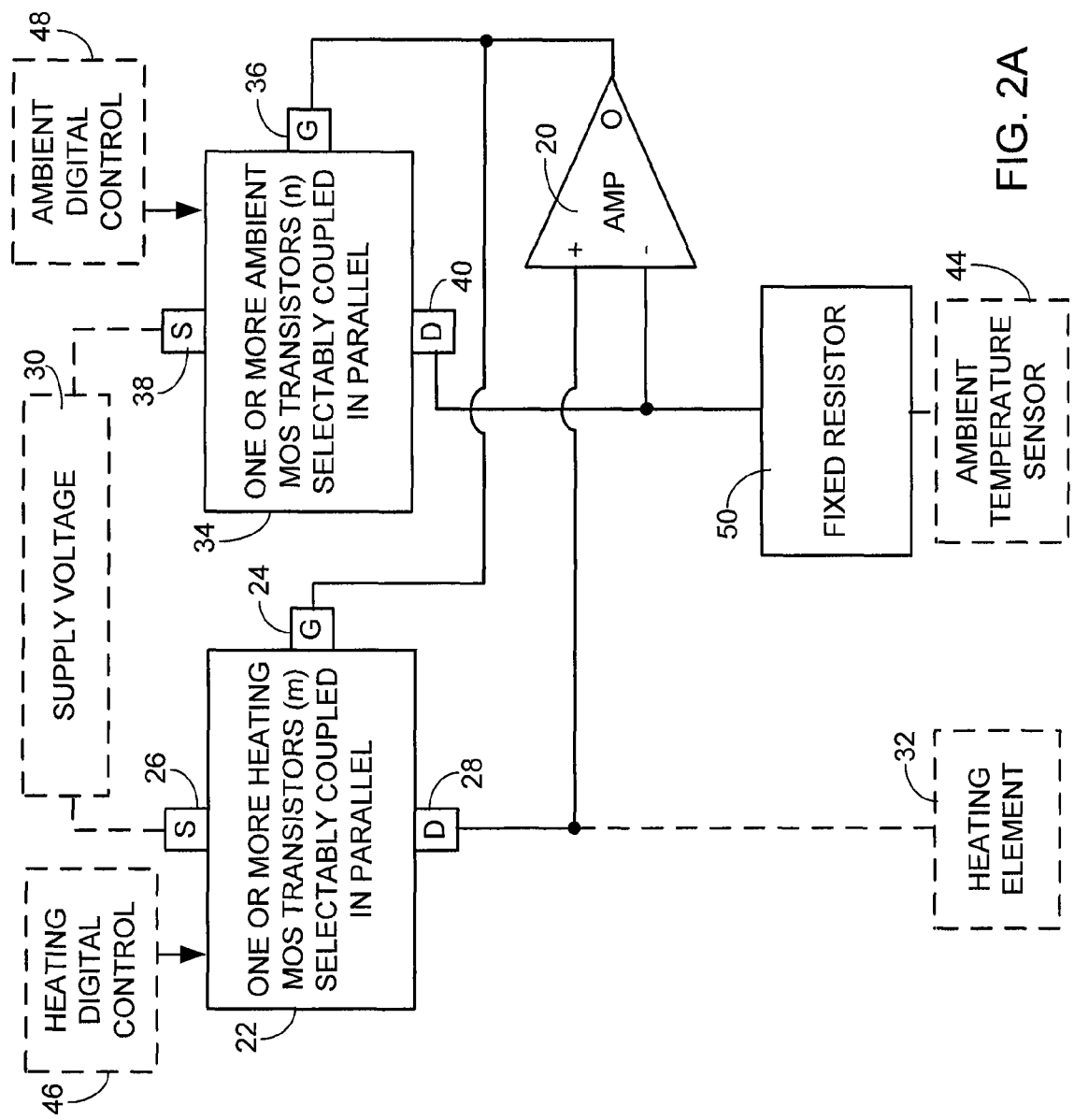
Figure 2B:
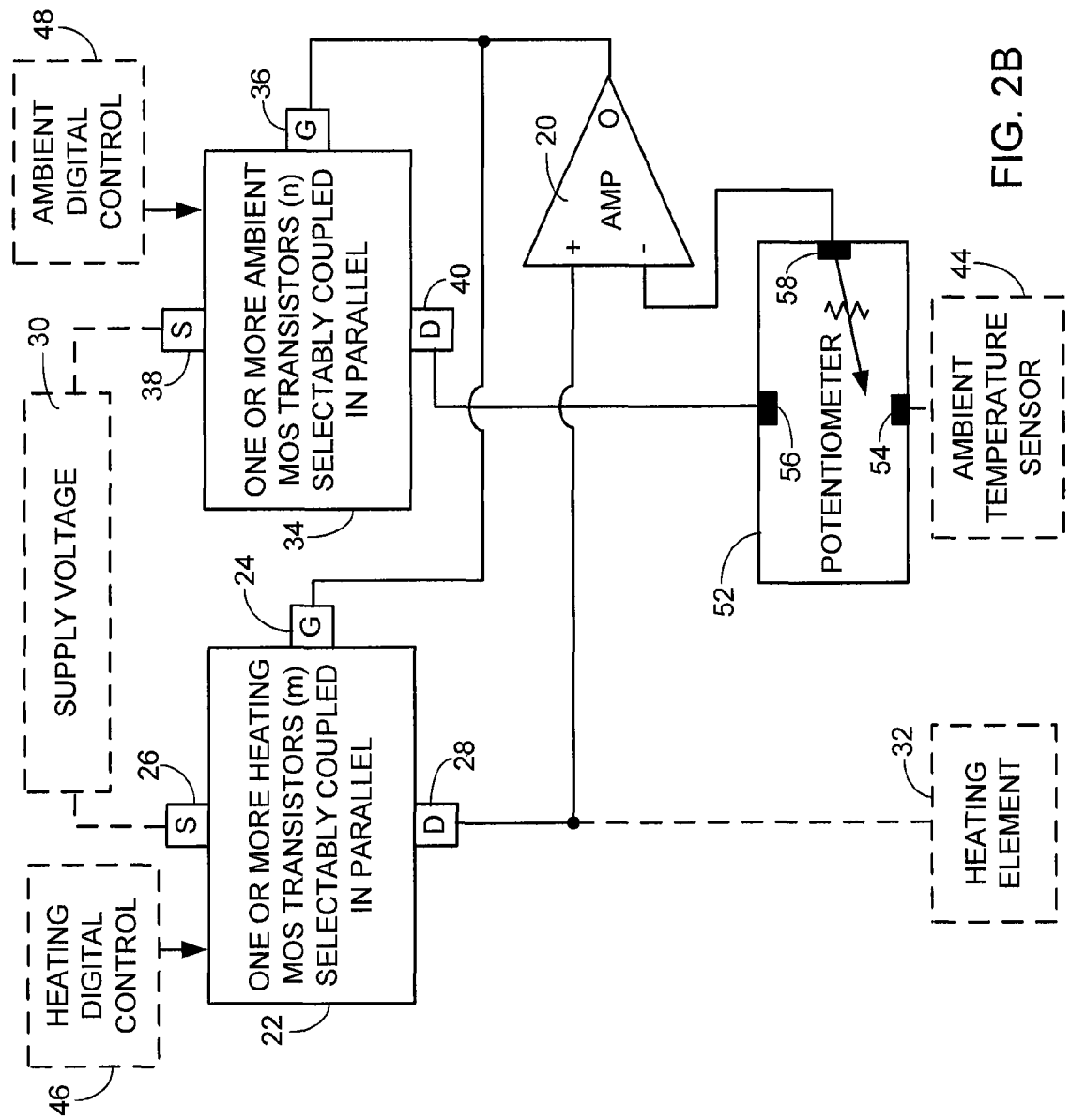

FIGS. 2A and 2B schematically illustrate further embodiments of circuitry for adjusting and calibrating a MEMS sensor device for flow measurement of gases or liquids. In particular, the embodiment of FIG. 2A illustrates that the temperature difference resistance referred-to above can be a fixed resistor 50. A fixed resistor 50 will suffice when only one fixed temperature difference is required. In this embodiment, the fixed temperature difference resistor 50 is coupled between the ambient temperature sensor 44 and both the negative input of the amplifier 20 and the ambient transistor drain 40. The operation of the remainder of the circuitry in FIG. 2A is otherwise similar to that of FIG. 1 which has been discussed above.

FIG. 2B illustrates that the temperature difference resistance referred-to above can be a potentiometer 52 having a first terminal 54, a second terminal 56, and a wiper 58. The potentiometer 52 is suitable for applications which require multiple temperature differences. In this embodiment, the first terminal 54 is configured to be coupled to the ambient temperature sensor 44, the second terminal 56 is coupled to the ambient transistor drain 40, and the wiper is coupled to the negative input of the amplifier 20. The operation of the remainder of the circuitry in FIG. 2B is otherwise similar to that of FIG. 1 which has been discussed above.

Figure 3:
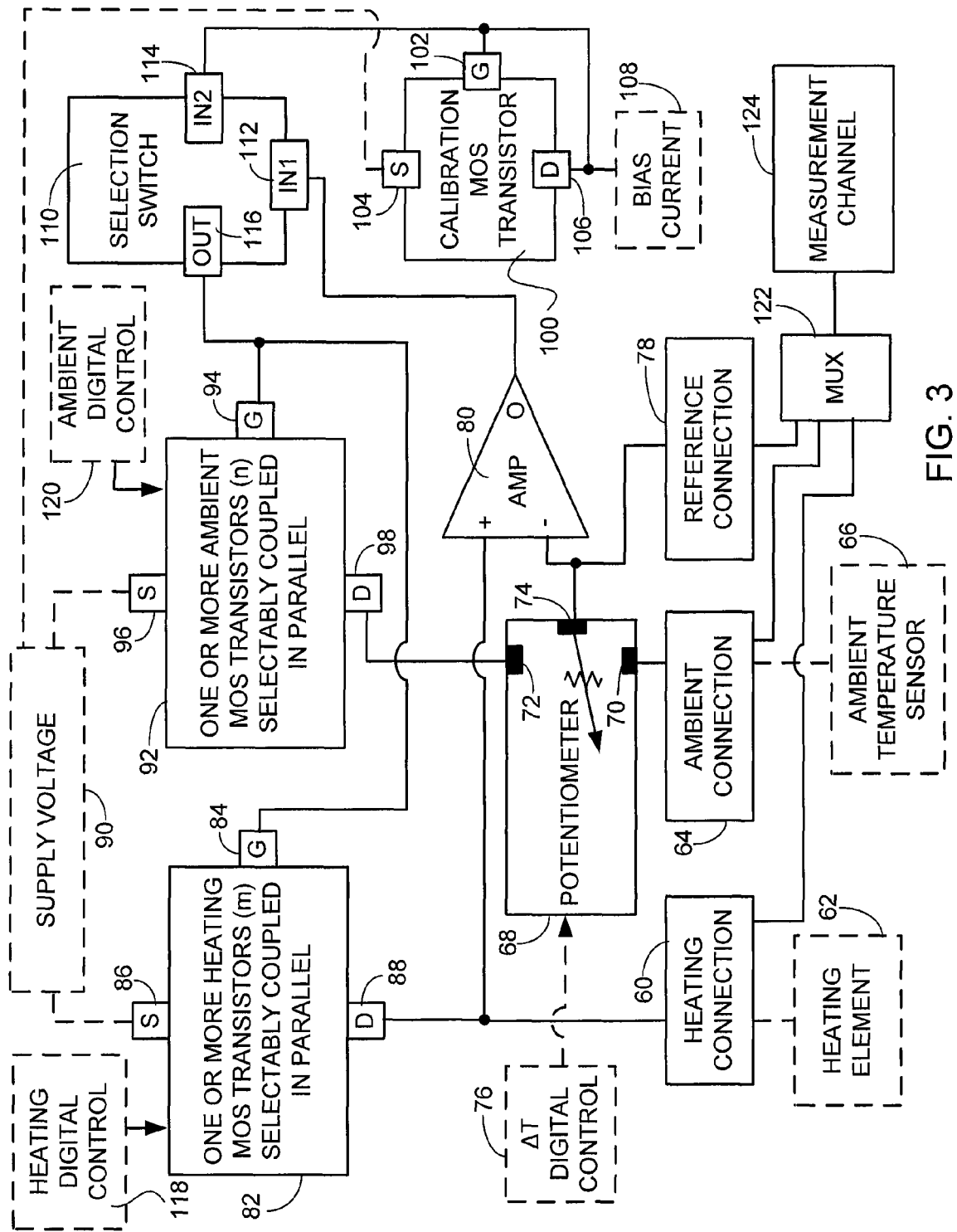

FIG. 3 illustrates another embodiment of circuitry for adjusting and calibrating a MEMS sensor device for flow measurement of gases or liquids, with additional elements designed to further enable the integration of the adjustment and calibration features. A heating connection 60 is configured to be coupled to a heating element 62. An ambient connection 64 is configured to be coupled to an ambient temperature sensor 66. A potentiometer 68 has a first terminal 70, a second terminal 72, and a wiper 74. The first terminal 70 is coupled to the ambient connection 64. The potentiometer 68 may be a digital potentiometer, adjustable in response to a temperature difference digital control 76. A reference connection 78 is coupled to the wiper 74. The circuitry also has an amplifier 80 having a positive input, a negative input, and an output (O). The negative input of the amplifier 80 is coupled to the reference connection 78. The positive input of the amplifier 80 is coupled to the heating connection 60.

One or more heating MOS transistors 82 are selectably coupled in parallel and have a collective heating transistor gate 84, heating transistor source 86, and a heating transistor drain 88. The heating transistor drain 88 is coupled to the heating connection 60 and the heating transistor source 86 is configured to receive a supply voltage 90. Similarly, one or more ambient MOS transistors 92 are selectably coupled in parallel and have a collective ambient transistor gate 94, ambient transistor source 96, and ambient transistor drain 98. The ambient transistor drain 98 is coupled to the second terminal 72 of the potentiometer 68. The ambient transistor source 96 is configured to receive the supply voltage 90.

A calibration MOS transistor 100 has a calibration transistor gate 102, calibration transistor source 104, and calibration transistor drain 106. The calibration transistor source 104 is configured to receive the supply voltage 90. The calibration transistor drain 106 is configured to receive a bias current 108, and the calibration transistor gate 102 is coupled to the calibration transistor drain 106.

A selection switch 110 is provided, having a first input 112, a second input 114, and an output 116. The first switch input 112 is coupled to the output of the amplifier 20. The second switch input 114 is coupled to the calibration transistor gate 102, and the switch output 116 is coupled to the ambient transistor gate 94 and the heating transistor gate 84.

A heating digital control 118 instructs or controls the one or more heating MOS transistors 82 to select the number (m) of heating MOS transistors which are coupled in parallel. This can be accomplished through individual gate switching. Similarly, an ambient digital control 120 instructs or controls the one or more ambient MOS transistors 92 to select the number (n) of heating MOS transistors which are coupled in parallel.

The heating connection 60, ambient connection 64, and reference connection 78 each may be coupled to a multiplexer 122 for sharing voltage signals from those connections with a measurement channel 124. Signals obtained from the heating connection 60, ambient connection 64, and/or reference connection 78 can be used during measurement and calibration routines as described in further detail with regard to FIGS. 4 and 5.

Figure 4:
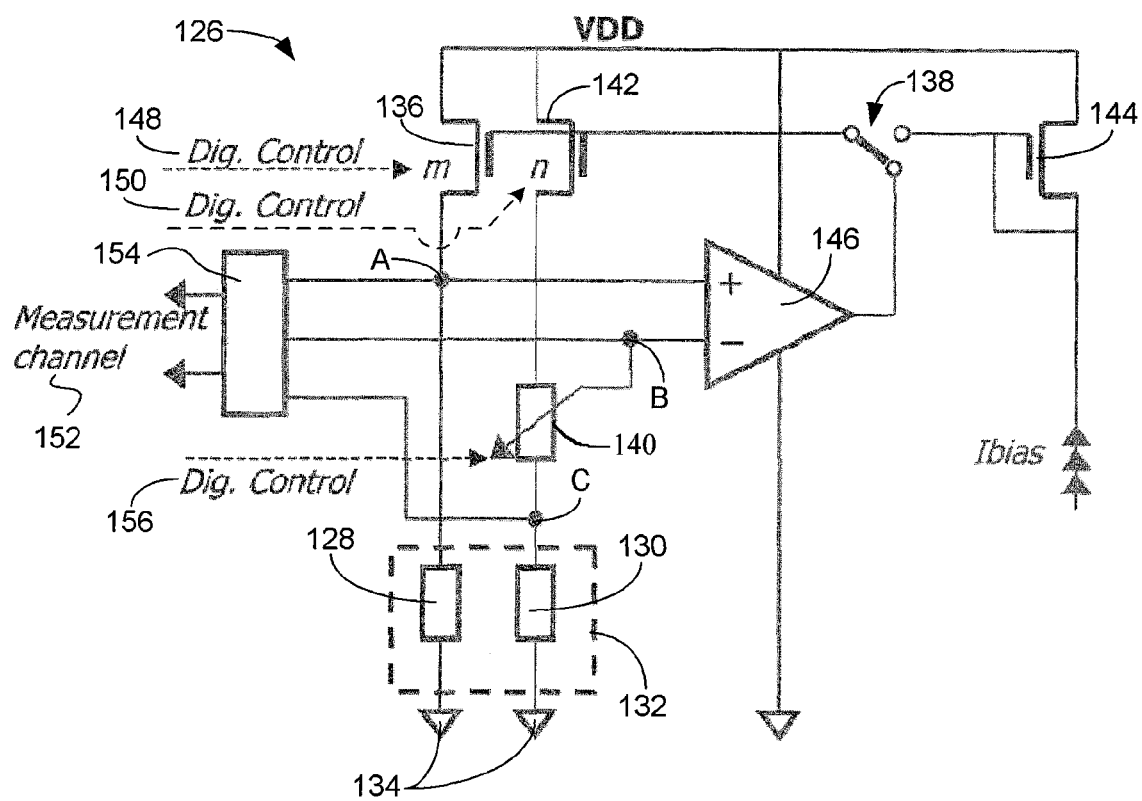

FIG. 4 schematically illustrates another embodiment of circuitry for adjusting and calibrating a MEMS sensor device for flow measurement of gases or liquids. This embodiment is described assuming a N-well CMOS process, however it should be understood that a p-well or other types of MOS processes could be used in other embodiments. FIG. 4 illustrates the circuit of the control loop 126, which keeps a constant temperature difference between the heater (heating element) 128 and the ambient temperature sensor 130. The heating element resistor 128 and the ambient temperature sensor resistor 130 are components of the MEMS sensor device (chip 132 and are connected on one side to ground 134. Resistor 128 works as a heating element, while resistor 130 operates as an ambient temperature sensor. A second terminal of the heating element 128 is coupled with a common drain terminal of one or more p-channel heating transistors 136. Their common gate terminal is connected to the output of selection switch 138 and their common source terminal is connected to the supply voltage VDD. The second terminal of the ambient temperature sensor 130 is connected with the first terminal of a digital potentiometer 140, whose second terminal is connected to a common drain terminal of one or more p-channel ambient transistors 142, whose gate terminal is likewise connected to the output of the selection switch 138.

The source terminal of a calibration PMOSFET 144 is connected to the supply voltage VDD. The wiper of the digital potentiometer 140 is connected to the negative input of an operational amplifier 146. Selection switch 138 connects the gate terminals of the one or more heating and ambient transistors 136, 142 in the normal operation mode of the control loop 126 with the output of the operational amplifier 146 or during calibration mode with the gate and the drain of the calibration transistor 144. The calibration transistor 144 is configured as a diode in this embodiment, its source terminal is connected to the supply voltage VDD, and a bias current is fed into its drain.

The positive input of the operational amplifier 146 is coupled to a heating connection A and the drain of the one or more heating MOS transistors 136. In this embodiment, the one or more heating MOS transistors 136 and the one or more ambient MOS transistors 142 have been implemented as parallel units with substantially equal layouts, whereby the number m of the heating MOS transistors 136 versus the number of n of the ambient MOS transistors 142 has an inverse relationship to the resistance of the heating element 128 and to the resistance of the ambient temperature sensor 130. In order to be able to adjust tolerances in the resistance relationship between the heater 128/sensor 130, the number of m of the single transistors and or the number n of the single transistors joined in parallel are changeable by digital controls 148, 150.

The interconnect points: heating connection A, reference connection B, and ambient connection C can be connected to the differential measuring channel 152 by means of a multiplexer 154, which serves the circuit for measurement of the Wheatstone Bridge in normal operation.

The impact of the circuit configuration is to use the change of its resistance, caused by self-heating of the heating element 128, in such a way that the temperature of the heating resistor lies 128 at a constant amount over the ambient temperature. Under the condition that the currents through heater 128 and ambient temperature sensor 130 behave inversely to their resistances at room temperature, the control loop stabilizes a temperature difference of:

$$\Delta T = R3/(RT0 * TC)$$

where R3 is the value of the potentiometer 140, RT0 the nominal resistance of the ambient temperature sensor 130 at room temperature and TC is the temperature coefficient of the ambient temperature sensor 130 as well as the heating element 128.

Thus the rise in temperature of the heating element 128 can be set in relation to the environment by means of the potentiometer 140. Assuming that the potentiometer 140 has a negligible temperature coefficient, this temperature difference is independent of the ambient temperature. The embodiments disclosed herein, and their equivalents have the advantage of implementing this theoretically derivable circuit behavior without considerable impairment to the integrated CMOS circuit. A direct conversion of a discreet component circuit fails because of the fact that relatively low impedance, electronically adjustable resistors must be integrated. Since the necessary transistor switches for such a direct conversion would lie in the current path, a falsification arises that could prevent a direct conversion of a discreet component circuit from maintaining the required accuracy. A solution with extremely low impedance switches at the expense of extensive chip area consumption prohibits an integration of such a circuit. By contrast, in the disclosed embodiments and their equivalents, a defined current ratio is set by the one or more heating MOS transistors 136 and the one or more ambient MOS transistors 142, whereby the absolute value of the current can be regulated over the common gate connection, without changing the current ratio.

The adjustment of the current ratio to the existing resistance ratio of heating element 128 and ambient temperature sensor 130 is made possible by the fact that the transistors 136 and 142 are made out of parallel unit transistors, whose ratio m/n can be changed in the context of the sensor calibration by switching on or switching off units. In this embodiment, switching a unit off takes place by digitally controlling 148, 150 the gate connection. This way no interference into the current path is necessary and therefore the regulation quality is not reduced. In the normal mode of the regulation, the common gate terminal of the one or more heating MOS transistors 136 and the common gate terminal of the one or more ambient MOS transistors 142 are connected to the output of the operational amplifier 146 by the selection switch 138. The potentiometer 140, which determines the temperature difference, is implemented favorably as digital potentiometer, controllable by a temperature difference digital control 156. Due to the current source characteristics of the transistors 136, 142 it is possible to keep the pick-up of the potentiometer 140 free of any load, thereby minimizing any affect on the regulation quality. As noted previously, many applications require only one fixed temperature difference. In such cases, the potentiometer 140 can be replaced by a fixed resistor with a low TC. When using a fixed resistor in-place of potentiometer 140, the negative input of the operational amplifier 146 has to be connected with the interconnect point of fixed resistor and the common drain terminal of the one or more ambient MOS transistors.

In order to substantially match 1) the current ratio of the transistors 136, 142 to 2) the resistance ratio of the heating element 128 versus the ambient temperature sensor 130 a calibration mode may be used in which the common gate terminals of the transistors 136, 142 are connected with the gate/drain terminals of the calibration MOS transistor 144 by the selection switch 138. In this calibration mode currents of the ratio m/n are fed into both the heater 128 and ambient temperature sensor 130, which are preferably small enough to prevent self heating of the resistors. Now, if the voltage difference between the heating connection A and ambient connection C is put over the multiplexer 154 to the measuring channel 152, the absolute value of the voltage difference can be minimized by gradual switching off or on 1) units of the one or more heating MOS transistors 136 and/or 2) units of the one or more ambient MOS transistors. In this way, a substantially optimized matching of the current ratio to the resistance ratio may be reached. This setting can be stored, for example, in the EEPROM of the signal conditioning unit of the circuit.

The described calibration process can be accomplished on a finalized flow sensor module without additional test points, i.e. only the digital communication interface existing on such a module is needed. Another feature of the circuit is the possibility of the measurement of the voltage at the reference connection B and ambient connection C against ground. For this, the voltages may be fed over the multiplexer 154 to the measuring channel 152. These two voltages can be captured from time to time without affecting the function of the control loop 126. Furthermore, the ratio of the voltage at heating connection A and reference connection B is a measure for the ambient temperature, which can be used for the correction of the temperature dependence of the flow measurement in the context of signal conditioning.

Figure 5:
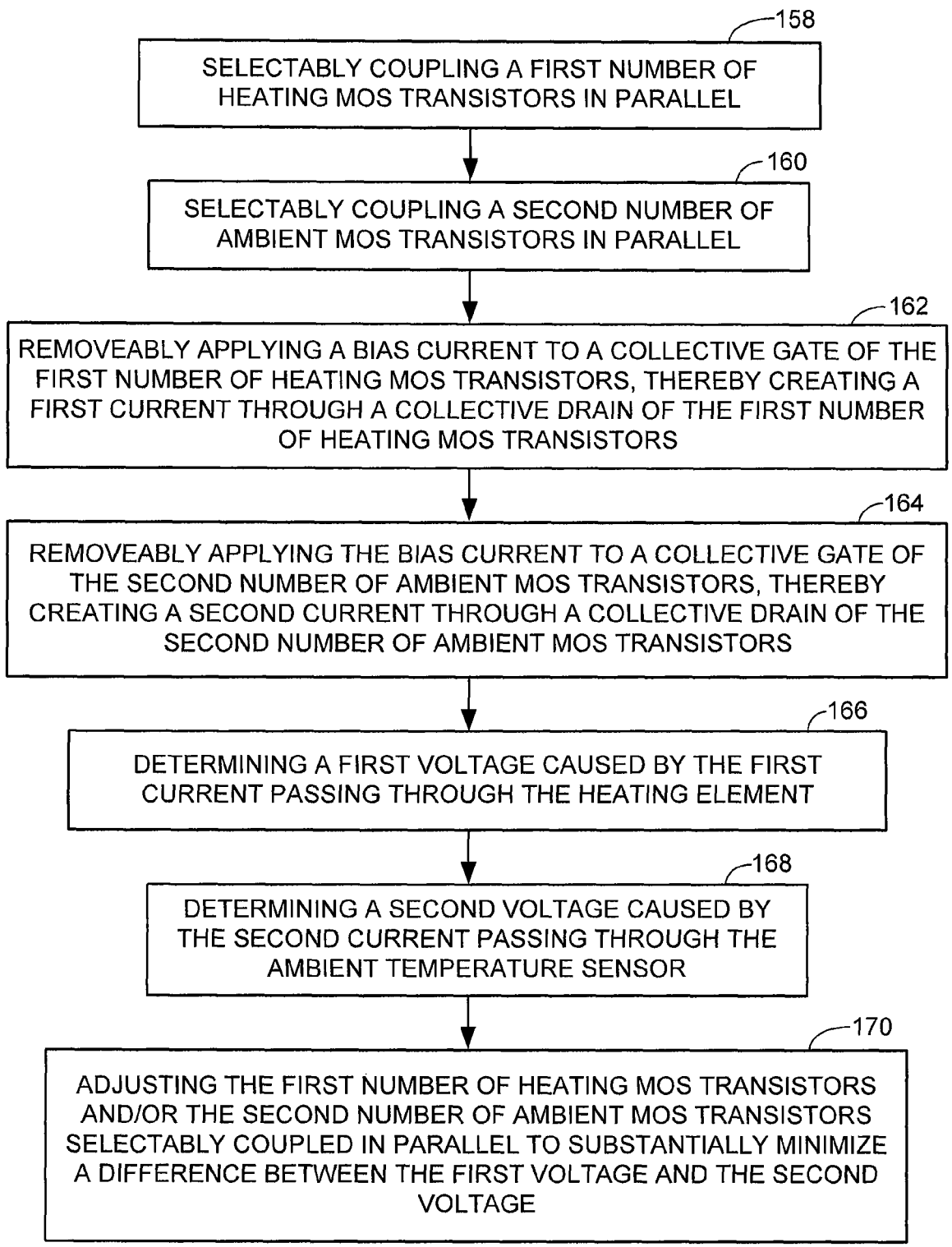
FIG. 5 illustrates an embodiment of a method for adjusting and calibrating a MEMS sensor device for flow measurement of gases or liquids.

FIG. 5 illustrates one embodiment of a method for adjusting and calibrating a heating element and an ambient temperature sensor. A first number of heating MOS transistors are selectably coupled 158 in parallel. A second number of ambient MOS transistors are selectably coupled 160 in parallel. A bias current is removeably applied 162 to a collective gate of the first number of heating MOS transistors, thereby creating a first current through a collective drain of the first number of heating MOS transistors. The bias current is removeably applied 164 to a collective gate of the second number of ambient MOS transistors, thereby creating a second current through a collective drain of the second number of ambient MOS transistors. A first voltage caused by the first current passing through the heating element is determined 166. A second voltage caused by the second current passing through the ambient temperature sensor is determined 168. The first number of heating MOS transistors and/or the second number of ambient MOS transistors selectably coupled in parallel are adjusted 170 to substantially minimize a difference between the first voltage and the second voltage.

Having thus described several embodiments of the claimed invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and the scope of the claimed invention. Additionally, the recited order of the processing elements or sequences, or the use of numbers, letters, or other designations therefore, is not intended to limit the claimed processes to any order except as may be specified in the claims. Accordingly, the claimed invention is limited only by the following claims and equivalents thereto.

What is claimed is:
1. Circuitry for the adjustment and calibration of a heating element and an ambient temperature sensor, comprising:
   a) an amplifier having a positive input, a negative input, and an output;
   b) one or more heating metal oxide semiconductor (MOS) transistors selectably coupled in parallel and having a heating transistor gate, a heating transistor source, and a heating transistor drain, wherein:
      1) the heating transistor drain is coupled to the positive input of the amplifier; and
      2) the heating transistor source is configured to receive a supply voltage;
      3) the heating transistor gate is coupled to the amplifier output;

c) one or more ambient MOS transistors selectably coupled in parallel and having an ambient transistor gate, an ambient transistor source, and an ambient transistor drain, wherein:
  1) the ambient transistor gate is coupled to the amplifier output; and
  2) the ambient transistor source is configured to receive the supply voltage; and
d) a temperature difference resistance configured:
  1) to be coupled at least partially between an ambient connection and the ambient transistor drain; and
  2) to be coupled at least partially between the ambient connection and the negative input of the amplifier.

2. The circuitry of claim 1, wherein the temperature difference resistance comprises a fixed resistor having a first terminal and a second terminal, wherein:
the first terminal is configured to be coupled to the ambient sensor connection; and
the second terminal is coupled to the ambient transistor drain and the negative input of the amplifier.

3. The circuitry of claim 1, wherein the temperature difference resistance comprises a potentiometer having a first terminal, a second terminal, and a wiper, wherein:
the first terminal is configured to be coupled to the ambient connection;
the second terminal is coupled to the ambient transistor drain; and
the wiper is coupled to the negative input of the amplifier.

4. The circuitry of claim 3, further comprising:
e) a calibration MOS transistor having a calibration transistor gate, a calibration transistor source, and a calibration transistor drain, wherein:
  1) the calibration transistor source is configured to receive the supply voltage;
  2) the calibration transistor drain is configured to receive a bias current; and
  3) the calibration transistor gate is coupled to the calibration transistor drain; and
f) a selection switch, in the coupling between the amplifier output and the ambient and heating transistor gates, having a first input, a second input, and an output, wherein:
  1) the first switch input is coupled to the amplifier output;
  2) the second switch input is coupled to the calibration transistor gate; and
  3) the switch output is coupled to the ambient transistor gate and the heating transistor gate.

5. The circuitry of claim 4, further comprises an ambient connection coupled to the first terminal of the potentiometer and configured to be coupled to the ambient temperature sensor, and wherein:
the coupling between the heating transistor drain and the positive input of the amplifier comprises a heating connection configured to be coupled to the heating element; and
the coupling between the wiper and the negative input of the amplifier comprises a reference connection.

6. The circuitry of claim 5, wherein the potentiometer comprises a digital potentiometer and further comprising a temperature difference digital control coupled to the digital potentiometer and configured to select a desired temperature difference.

7. The circuitry of claim 5, further comprising a heating digital control coupled to the one or more heating MOS transistors for selectably controlling how many of the one or more heating MOS transistors are actively in parallel.

8. The circuitry of claim 5, further comprising an ambient digital control coupled to the one or more ambient MOS transistors for selectably controlling how many of the one or more ambient MOS transistors are actively in parallel.

9. The circuitry of claim 5, further comprising:
a heating digital control coupled to the one or more heating MOS transistors for selectably controlling how many of the one or more heating MOS transistors are actively in parallel; and
an ambient digital control coupled to the one or more ambient MOS transistors for selectably controlling how many of the one or more ambient MOS transistors are actively in parallel.

10. The circuitry of claim 9, further comprising: a multiplexer coupled to the heating connection, the ambient connection, and the reference connection.

11. A method of adjusting and calibrating a heating element and an ambient temperature sensor, comprising:
selectably coupling a first number of heating MOS transistors in parallel;
selectably coupling a second number of ambient MOS transistors in parallel;
removeably applying a bias current to a collective gate of the first number of heating MOS transistors, thereby creating a first current through a collective drain of the first number of heating MOS transistors;
removeably applying the bias current to a collective gate of the second number of ambient MOS transistors, thereby creating a second current through a collective drain of the second number of ambient MOS transistors;
determining a first voltage caused by the first current passing through the heating element;
determining a second voltage caused by the second current passing through the ambient temperature sensor; and
adjusting the first number of heating MOS transistors and/or the second number of ambient MOS transistors selectably coupled in parallel to substantially minimize a difference between the first voltage and the second voltage.

12. The method of claim 11, wherein removeably applying the bias current to the collective gates of the first number of heating MOS transistors and the second number of ambient MOS transistors comprises:
switching the collective gates from a control loop amplifier output to a gate of a calibration MOS transistor, wherein the bias current is coupled to a drain of the calibration MOS transistor, and the gate of the calibration MOS transistor is further coupled to the drain of the calibration MOS transistor.

13. The method of claim 11, wherein:
selectably coupling the first number of heating MOS transistors in parallel comprises digitally controlling individual gate connections for the first number of heating MOS transistors; and
selectably coupling the second number of ambient MOS transistors in parallel comprises digitally controlling individual gate connections for the second number of ambient MOS transistors.

14. The method of claim 11, further comprising storing the first number of heating MOS transistors and/or the second number of ambient MOS transistors selectably coupled in parallel which substantially minimizes a difference between the first voltage and the second voltage.

15. Circuitry for the adjustment and calibration of a heating element and an ambient temperature sensor, comprising:
a) a heating connection configured to be coupled to the heating element;

b) an ambient connection configured to be coupled to the ambient temperature sensor;
c) a potentiometer having a first terminal, a second terminal, and a wiper, wherein the first terminal is coupled to the ambient connection;
d) a reference connection configured to be coupled to the potentiometer wiper;
e) an amplifier having a positive input, a negative input, and an output, wherein:
   1) the negative input is coupled to the reference connection; and
   2) the positive input is coupled to the heating connection;
f) one or more heating metal oxide semiconductor (MOS) transistors selectably coupled in parallel and having a heating gate, a heating transistor source, and a heating transistor drain, wherein:
   1) the heating transistor drain is coupled to the heating connection; and
   2) the heating transistor source is configured to receive a supply voltage;
g) one or more ambient MOS transistors selectably coupled in parallel and having an ambient gate, an ambient transistor source, and an ambient transistor drain, wherein:
   1) the ambient transistor drain is coupled to the second terminal of the potentiometer; and
   2) the ambient transistor source is configured to receive the supply voltage;
h) a calibration MOS transistor having a calibration gate, a calibration transistor source, and a calibration transistor drain, wherein:
   1) the calibration transistor source is configured to receive the supply voltage;
   2) the calibration transistor drain is configured to receive a bias current; and
   3) the calibration transistor gate is coupled to the calibration transistor drain;
i) a selection switch having a first input, a second input, and an output, wherein:
   1) the first switch input is coupled to the amplifier output;
   2) the second switch input is coupled to the calibration transistor gate; and
   3) the switch output is coupled to the ambient transistor gate and the heating gate.

16. The circuitry of claim 15, wherein the potentiometer comprises a digital potentiometer and further comprising a temperature difference digital control coupled to the digital potentiometer and configured to select a desired temperature difference.

17. The circuitry of claim 15, further comprising a heating digital control coupled to the one or more heating MOS transistors for selectably controlling how many of the one or more heating MOS transistors are actively in parallel.

18. The circuitry of claim 15, further comprising an ambient digital control coupled to the one or more ambient MOS transistors for selectably controlling how many of the one or more ambient MOS transistors are actively in parallel.

19. The circuitry of claim 15, further comprising:
   a heating digital control coupled to the one or more heating MOS transistors for selectably controlling how many of the one or more heating MOS transistors are actively in parallel; and
   an ambient digital control coupled to the one or more ambient MOS transistors for selectably controlling how many of the one or more ambient MOS transistors are actively in parallel.

20. The circuitry of claim 19, further comprising: a multiplexer coupled to the heating connection, the ambient connection, and the reference connection.

* * * * *

UNITED STATES PATENT AND TRADEMARK OFFICE
CERTIFICATE OF CORRECTION

| | |
|---|---|
| PATENT NO. | : 8,075,178 B2 |
| APPLICATION NO. | : 12/369645 |
| DATED | : December 13, 2011 |
| INVENTOR(S) | : Krauss et al. |

It is certified that error appears in the above-identified patent and that said Letters Patent is hereby corrected as shown below:

In the Assignee Item (73), Delete "Desden AG" and insert -- Dresden AG --

Signed and Sealed this
Twenty-seventh Day of March, 2012

David J. Kappos
*Director of the United States Patent and Trademark Office*